United States Patent
Junginger

(10) Patent No.: US 7,450,289 B2
(45) Date of Patent: Nov. 11, 2008

(54) LOW POWER DRIVER CIRCUIT FOR A POLARIZATION SCRAMBLER

(75) Inventor: Bernhard Junginger, Leonberg (DE)

(73) Assignee: Alcatel, Paris (FR)

( * ) Notice: Subject to any disclaimer, the term of this patent is extended or adjusted under 35 U.S.C. 154(b) by 156 days.

(21) Appl. No.: 11/395,304

(22) Filed: Apr. 3, 2006

(65) Prior Publication Data

US 2006/0250835 A1   Nov. 9, 2006

(30) Foreign Application Priority Data

Apr. 15, 2005   (EP)   ................... 05290847

(51) Int. Cl.
*G02F 1/03* (2006.01)
(52) U.S. Cl. ...................... 359/246; 307/106
(58) Field of Classification Search ................. 359/240, 359/246, 264, 276, 278, 328, 329, 326, 332, 359/495; 365/145, 73.1, 503; 398/25; 307/106; 372/20, 22; 332/103; 367/107
See application file for complete search history.

(56) References Cited

U.S. PATENT DOCUMENTS

| | | | | |
|---|---|---|---|---|
| 3,134,915 A | * | 5/1964 | Ensink et al. | ............... 307/106 |
| 3,457,417 A | * | 7/1969 | Buchsbaum et al. | ........ 359/276 |
| 3,523,275 A | * | 8/1970 | Gross | ......................... 367/107 |
| 4,175,827 A | | 11/1979 | McMahon | |
| 5,592,131 A | * | 1/1997 | Labreche et al. | ............ 332/103 |
| 6,987,785 B2 | * | 1/2006 | Sakata et al. | ................... 372/22 |
| 2002/0015548 A1 | | 2/2002 | Jiang | |

FOREIGN PATENT DOCUMENTS

| EP | 0 630 122 A1 | 12/1994 |
|---|---|---|
| EP | 0 782 282 A2 | 2/1997 |

OTHER PUBLICATIONS

Heismann F: "Compact Electro-Optic Polarization Scramblers For Optically Amplified Lightwave Systems" Journal of Lightwave Technology, IEEE> New York, US, vol. 14, No. 8, Aug. 1, 1996, ppa 1801-1814, XP00630976.

* cited by examiner

*Primary Examiner*—Loha Ben
(74) *Attorney, Agent, or Firm*—Sughrue Mion, PLLC

(57) ABSTRACT

A driver circuit for a polarization scrambler (11) having a number of electrodes (17) is characterized in that the driver circuit comprises at least one pulse source (18) emitting a pulsed signal at a fundamental frequency, that the driver circuit further comprises a plurality of passive filter and matching circuits (19) for said number of electrodes (17) of said polarization scrambler (11), wherein each passive filter and matching circuit (19) is designed for driving one or several of the electrodes (17), and wherein each passive filter and matching circuit (19) is designed such that it filters out at least one harmonic mode frequency of said pulsed signal. The inventive driver circuit has a low power consumption and generates only few heat.

9 Claims, 2 Drawing Sheets state of the art

LOW POWER DRIVER CIRCUIT FOR A POLARIZATION SCRAMBLER

The invention is based on a priority application EP 05290847.2 which is hereby incorporated by reference.

1. Field of the Invention

The invention relates to a driver circuit for a polarization scrambler having a number of electrodes.

2. Background of the Invention

Such a driver circuit is used with the commercially available polarization controller type PC -A3-00-SM-FU-S-FU, distributed by EOSPACE Inc., Redmond, Wash. 98052, USA.

In optical transmission systems, in particular optical data networks, polarization mode dispersion (PMD) limits the data transfer capacity. Therefore, it is useful to mitigate PMD in order to keep the line bit error rate (BER) low.

One approach to mitigate PMD is polarization scrambling. The polarization is scrambled in order to cover the Poincaré sphere on an adequate trajectory within an optical transmission line for any arbitrary input polarization state.

Polarization scramblers of the state of the art consist of multiple-section polarization modulators. Each section commonly comprises at least three electrodes, one grounded and two being driven with appropriate electrical drive signals. The driven electrodes, for the modulator mentioned above, variably retard one polarization or variably transfer light from one linear polarization state to the orthogonal one. When applied appropriately in several concatenated sections, any arbitrary output polarization state can be reached from any arbitrary input polarization state with this type of modulators. There exist different types of modulators that reach the same goal on different functionalities of the individual sections, e.g. 3 variable retarders with optical axes orientated at 0°, 45°, 0°. For each driven electrode or electrode set, a separate driver amplifier is used. In commercial applications, high AC voltages of about 70 V peak to peak and high frequencies of 10, 20 and 30 MHz, plus DC offset, and more are used for the first, second and third section, respectively.

These driver circuits consume high power, incompatible with standard telecom equipment practice. The driver amplifiers also generate significant heat, beyond the limits of standard telecom equipment practice.

It is the object of this invention to provide a driver circuit for a polarization scrambler with a lower power consumption and thus less generation of heat, in particular compatible with standard equipment practice.

SUMMARY OF THE INVENTION

This object is achieved, in accordance with the invention, by a driver circuit as introduced in the beginning, characterized in that the driver circuit comprises at least one pulse source emitting a pulsed signal at a fundamental frequency, that the driver circuit further comprises a plurality of passive filter and matching circuits for said number of electrodes of said polarization scrambler, wherein each passive filter and matching circuit is designed for driving one or several of the electrodes, and wherein each passive filter and matching circuit is designed such that it filters out at least one harmonic mode frequency of said pulsed signal. Several pulse sources may be used instead of a single one.

For telecom applications, driving signals for the electrodes of multi-section polarization modulators (i.e. polarization scramblers) can be harmonically related sine waves or combinations of sine waves with different, harmonically related, frequencies. Using a pulse source with an appropriate duty cycle operating at the fundamental frequency of the required harmonic frequencies, a high voltage with high harmonic content can be generated with low power losses in the signal generator, preferably a transistor. For each electrode, a signal with the required harmonic number(s) is filtered out. If necessary and/or desired, the phase of the signal is adjusted with respect to the opposing electrode of the same section and to the electrode sets of the neighbouring sections, its amplitude is leveled to an appropriate value, and a DC voltage is added in a bias circuit. Finally, the signal is applied to the polarization modulator electrode.

Power needed for polarization scrambling is thus reduced to (low) parasitic switching and matching losses in the signal generator resp. the pulse source and in the passive filter and matching circuits, plus power consumed in the electrodes themselves, e.g. due to parasitic electro-acoustic effects and to heat generated in the ohmic resistance of the electrodes. For this reason, by means of the inventive driver circuit, polarization scrambling is an economic approach for mitigation of PMD in optical transmission.

In a highly preferred embodiment of the inventive driver circuit, for each electrode one passive filter and matching circuit is provided. Each electrode may then be subject to an individual driving signal, granting high flexibility.

In another preferred embodiment, each passive filter and matching circuit is designed such that it filters out one harmonic mode frequency of said pulsed signal. This keeps the design of the filter and matching circuit simple.

Particularly preferred is an embodiment wherein each passive filter and matching circuit is designed such that it further adjusts a phase and/or an amplitude level and/or a DC bias of said pulsed signal. This provides optimum efficiency of the polarization scrambling, and also keeps the design of the driver circuit simple.

Further preferred is an embodiment wherein the fundamental frequency is at least 0.1 MHz, in particular about 10 MHz. The scrambling process then is considered fast enough to provide a sufficient averaging of the PMD effects, and thus raw BER before error correction, for common optical telecom line transmission formats as standardized e.g. by ITU.

The scope of the invention also comprises a polarization scrambler comprising a number of electrodes, characterized in that it comprises a driver circuit in accordance with the invention as described above. The inventive polarization scrambler profits from the low power consumption of the inventive driver circuit.

A preferred embodiment of the inventive polarization scrambler is characterized in that it comprises a multitude of sections, with each section comprising at least two electrodes, wherein each section is driven by one passive filter and matching circuit. Typically, the driving signals of the electrodes of one section are of identical frequencies with identical or opposing phase, and the driving signals of the electrodes can be generated by one passive filter and matching circuit only, plus a small transformer. This keeps the embodiment simple and inexpensive.

In a further development of this embodiment, the passive filter and matching circuit of each section comprises means for adjusting the phases and/or the amplitude levels and/or the DC biases of each electrode of the section separately. This grants a high flexibility for the driving signals of the electrodes of one section.

Another preferred embodiment of the inventive polarization scrambler is characterized in that it comprises a multitude of sections, with each section comprising at least three electrodes, wherein one of the electrodes of a section is grounded, and the other electrodes of a section are driven with an identical harmonic mode frequency. This embodiment has proved itself in practice.

Also within the scope of the present invention is the use of one or several inventive polarization scramblers as described above for mitigation of polarization mode dispersion in an optical data transmission system. Preferably, polarization scramblers are distributed over the entire transmission distance of an optical transmission line, and a polarization scrambler may be located at the transmitter site.

Further advantages can be extracted from the description and the enclosed drawing. The features mentioned above and below can be used in accordance with the invention either individually or collectively in any combination. The embodiments mentioned are not to be understood as exhaustive enumeration but rather have exemplary character for the description of the invention.

DETAILED DESCRIPTION OF THE INVENTION

Figure 1:
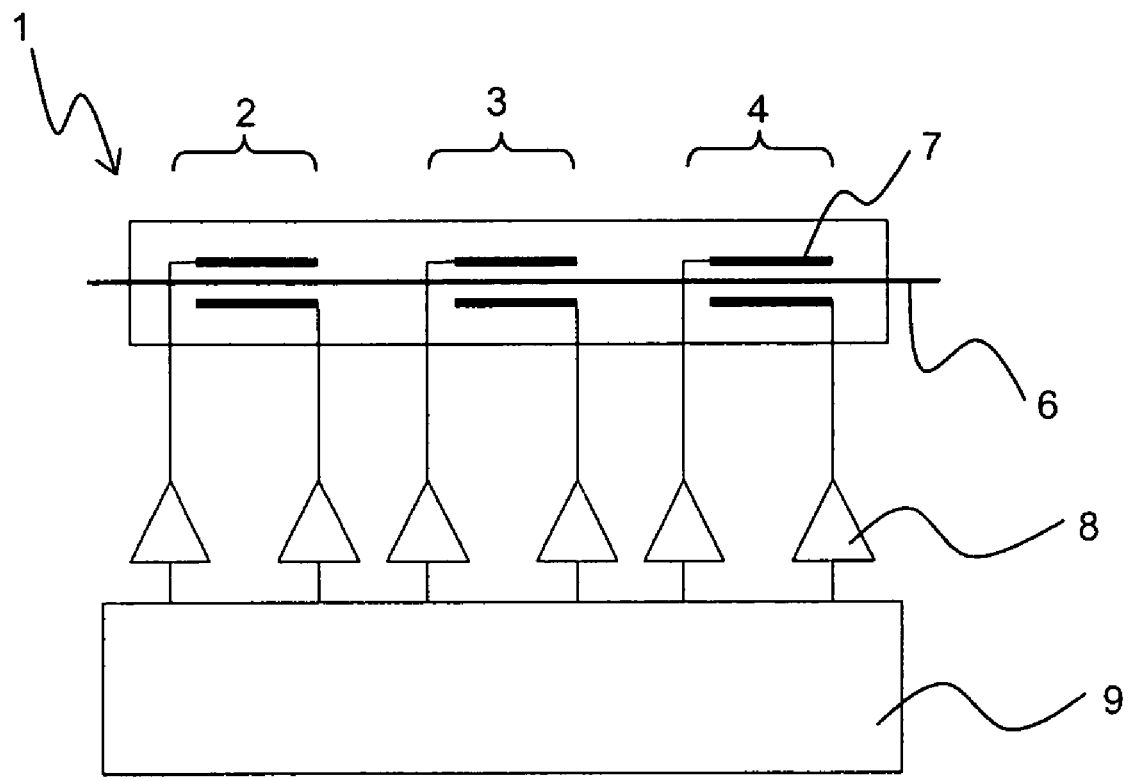
FIG. 1 shows a schematic of a polarization scrambler with a state of the art driver circuit.

FIG. 1 shows a schematic of a polarization scrambler 1 with a driver circuit of the state of the art, i.e. a conventional broadband linear driver amplifier approach. The polarization scrambler 1 is designed as a 3-section LiNbO polarization modulator, with the three sections 2, 3, 4. Within the polarization scrambler 1, there is an optical waveguide 6. Within each section 2, 3, 4, two electrodes 7 act upon the waveguide 6 and an optical signal carried within the optical waveguide 6. The electrodes 7 apply a sinusoidal voltage to the waveguide 6, with a peak to peak amplitude of up to 70 Volts. The sections 2, 3, 4 operate at 10 MHz, 20 MHz and 30 MHz, respectively.

These sinusoidal voltages are supplied by class A amplifiers 8. For each electrode 7, one amplifier 8 is provided. The amplifiers 8 receive low level drive signals to be amplified from a driving signal generator 9. The amplifiers 8 operate in their linear regime commonly referred to as class A, supplying output voltage proportional to the drive signal at all times. The amplifiers 8 therefore consume a lot of power, and generate a lot of heat. Both of these effects are incompatible with standard telecommunication equipment practice, making the use of this known driver circuit difficult and expensive.

Figure 2:
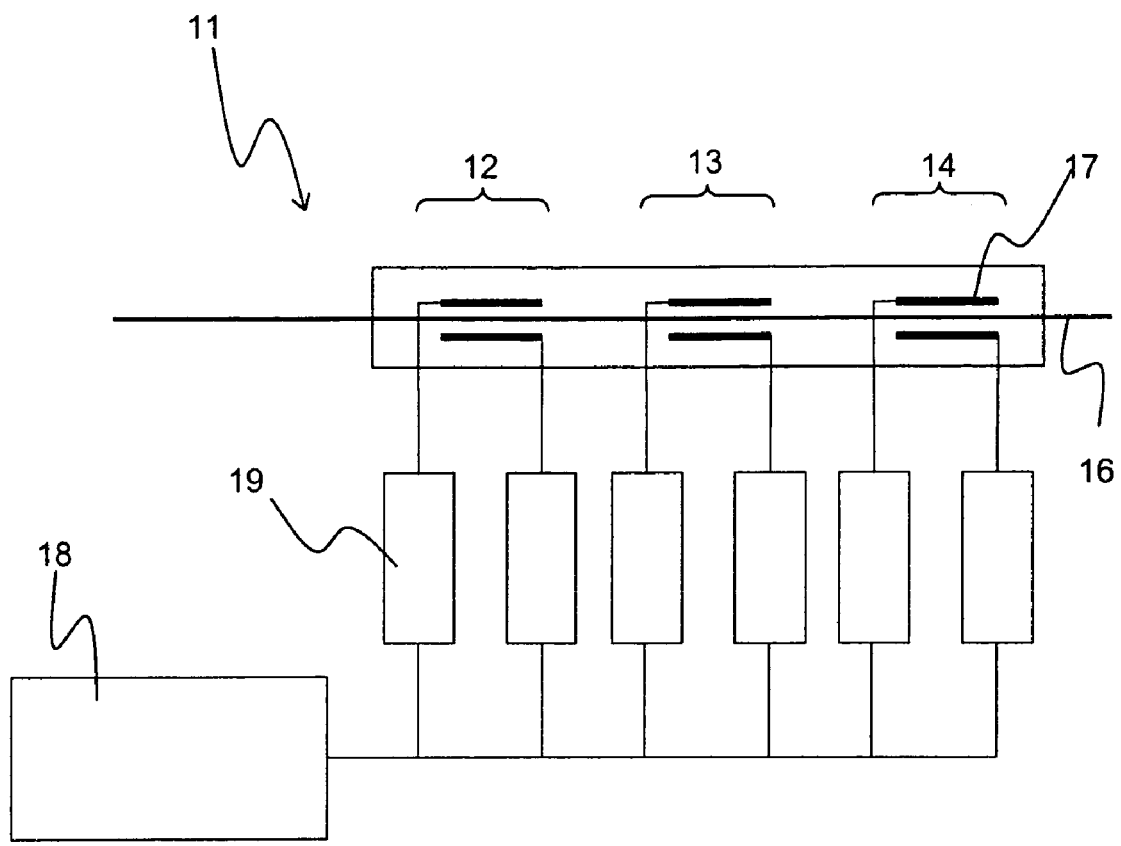
FIG. 2 shows a schematic of a polarization scrambler with a driver circuit in accordance with the invention.

FIG. 2 shows a schematic of a polarization scrambler 11 with a driving circuit in accordance with the invention. The polarization scrambler 11 is again designed as a 3-section LiNbO polarization modulator, with the three sections 12, 13, 14. Within the polarization scrambler 11, an optical waveguide 16 is provided, carrying an optical signal. The sections 12, 13, 14 comprise electrodes 17 for acting upon the optical waveguide 6 resp. the optical signal. The optical signal is a data signal with a data transfer rate of 10 Gbit/s or more, and may consist of several wavelenghts carrying individual traffic (WDM/DWDM/CWDM).

The driver circuit comprises a pulse source 18 for generating a pulsed signal, and passive filter and matching circuits 19. In the embodiment of FIG. 2, for each electrode 17 one passive filter and matching circuit 19 is provided. The pulse source 18 generates a pulsed signal of a fundamental frequency of 10 MHz. In each pulse cycle, e.g. 20% of the time the signal is non-zero and 80% of the time the signal is zero. The short pulse makes the pulsed signal rich in harmonic content. Note that any pulse wave form, such as a rectangle, saw tooth, triangle or distorted sine wave cap as from class C operated transistors, and other duty cycles, in particular adjustable duty cycles, are possible in accordance with the invention.

In each passive filter and matching circuit 19, a part of the pulsed signal is filtered out. At the passive filter and matching circuits 19 belonging to the electrodes 17 of the first section 12, the harmonic mode frequency of 10 MHz is filtered out, and appropriate DC biases are applied. At the passive filter and matching circuits 19 belonging to the electrodes 17 of the other sections 13, 14, the harmonic mode frequencies filtered out are 20 MHz and 30 MHz, respectively. The peak to peak voltages of the filtered driving signals are about 70 V.

In accordance with the invention, a harmonic mode frequency of a pulsed signal of a fundamental frequency is defined as follows: 1) The harmonic mode frequency has a sinusoidal form, and 2) the quotient of the frequencies of the harmonic mode frequency and the fundamental frequency is a natural number, including 1.

The output stage of the pulse source 18 acts as a class D amplifier, i.e. a signal generator of the pulse source 18 is only switched on and switched off. The signal generator of the pulse source 18 may comprise a transistor. Power losses substantially only occur during the short on/off and off/on transitions only and due to parasitic effects, both of which are small compared to losses within the class A amplifiers of FIG. 1.

In accordance with the invention, the pulse source 18 and the passive filter and matching circuits 19 can be connected to a controller device (not shown), controlling the fundamental frequency and the duty cycle at the pulse source 18 as well as the harmonic mode frequencies, phase adjustments, amplitude levels and DC biases at the passive filter and matching circuits 19.

In accordance with the invention, it is also possible to use a multitude of pulse sources, with each pulse source controlling a multitude of electrodes of one polarization scrambler.

In summary, the inventive driver circuit allows the operation of a polarization scrambler at a low power consumption and low heat generation, in particular agreeable with the limits imposed by standard telecommunication equipment practice. The power is saved due to the use of a pulse source as signal generator with low inherent energy loss. The pulse source can provide all necessary driving signals for the electrodes of a polarization scrambler after suitable passive filtering of the pulsed signal.

The invention claimed is:

1. A polarization scrambler comprising:
a number of polarization modulating electrodes; and
a driver circuit,
wherein the driver circuit comprises:
    at least one pulse source emitting a pulsed signal at a fundamental frequency; and
    a plurality of passive filter and matching circuits for said number of polarization modulating electrodes of said polarization scrambler,
wherein each passive filter and matching circuit is connected to at least one of the polarization modulating electrodes,
wherein each passive filter and matching circuit is designed to filter out at least one harmonic mode frequency of said pulsed signal, and wherein the driver circuit provides a plurality of harmonic mode frequencies to the polarization modulating electrodes.

2. The polarization scrambler according to claim 1, wherein, for each polarization modulating electrode, one passive filter and matching circuit is provided.

3. The polarization scrambler according to claim 1, wherein each passive filter and matching circuit is designed to filter out one harmonic mode frequency of said pulsed signal.

4. The polarization scrambler according to claim 1, wherein each passive filter and matching circuit is designed to further adjust a phase and/or an amplitude level and/or a DC bias of said pulsed signal.

5. The polarization scrambler according to claim 1, wherein the fundamental frequency is at least 0.1 MHz.

6. The polarization scrambler according to claim 1, further comprising a multitude of sections, wherein each section of the multitude of sections comprises at least two polarization modulating electrodes, and wherein each electrode is driven by one passive filter and matching circuit.

7. The polarization scrambler according to claim 6, wherein the passive filter and matching circuit of each section comprises means for adjusting the phases and/or the amplitude levels and/or the DC biases of each polarization modulating electrode of the section separately.

8. The polarization scrambler according to claim 1, further comprising:

a multitude of sections, wherein each section comprises at least three polarization modulating electrodes, wherein one of the at least three polarization modulating electrodes of a section of the multitude of sections is grounded, and the other of the at least three polarization modulating electrodes of a section of the multitude of sections are driven with an identical harmonic mode frequency.

9. The polarization scrambler according to claim 1, wherein the fundamental frequency is substantially 10 MHz.

* * * * *